United States Patent [19]

Grauwiller

[11] Patent Number: 6,022,396

[45] Date of Patent: Feb. 8, 2000

[54] PROCESS FOR TREATMENT OF RESIDUES WHICH ARISE IN INDUSTRIAL PROCESSES AND IN WASTE INCINERATION

[75] Inventor: Markus Grauwiller, Stettlen, Switzerland

[73] Assignee: Refista Recycling AG, Tenniken, Switzerland

[21] Appl. No.: 08/930,991

[22] PCT Filed: Apr. 15, 1996

[86] PCT No.: PCT/CH96/00136

§ 371 Date: Oct. 14, 1997

§ 102(e) Date: Oct. 14, 1997

[87] PCT Pub. No.: WO96/32516

PCT Pub. Date: Oct. 17, 1996

[30] Foreign Application Priority Data

Apr. 13, 1995 [CH] Switzerland ............................ 1073/95

[51] Int. Cl.$^7$ ............................ C22C 21/02; C25C 3/06
[52] U.S. Cl. ................................ 75/434; 75/500; 75/669; 75/670; 205/364; 420/590
[58] Field of Search ........................... 205/364; 75/10.27, 75/434, 500, 669, 670; 420/590

[56] References Cited

U.S. PATENT DOCUMENTS

| | | | |
|---|---|---|---|
| 1,835,244 | 12/1931 | Schorn | 205/364 |
| 4,188,207 | 2/1980 | Adams, Jr. | 75/68 |
| 4,430,120 | 2/1984 | Fruchter et al. | 75/68 |
| 4,436,550 | 3/1984 | Kapolyi | 75/10.54 |
| 4,724,054 | 2/1988 | Brown et al. | 204/67 |
| 4,761,207 | 8/1988 | Stewart, Jr. | 204/67 |
| 4,770,696 | 9/1988 | Brown et al. | 75/68 |
| 4,812,168 | 3/1989 | Cochran et al. | 75/68 |
| 5,498,320 | 3/1996 | Rendall | 205/385 |

FOREIGN PATENT DOCUMENTS 968014 8/1964 United Kingdom .

*Primary Examiner*—Melvyn Andrews
*Attorney, Agent, or Firm*—Jacobson, Price, Holman & Stern, PLLC

[57] ABSTRACT

The residues arising from industrial processes and from waste disposal which are polluted with heavy metals and/or heavy metal compounds, are subjected to a two-stage reduction process with formation of re-usable metal-containing and silicon-containing alloys. In a first reduction stage, using carbon or carbon-generating means as the reduction means, the compounds of silicon and metals are reduced, which have a standard potential which is greater than that of silicon. Following separation of the reduced metals, the residue obtained, which contains aluminum in oxidized form, is subsequently converted to a salt melt and this salt melt is subjected to a second reduction stage of a fused salt electrolysis, yielding an aluminum and silicon melt. The process is particularly suitable for filter residues from waste incineration plants.

15 Claims, No Drawings

PROCESS FOR TREATMENT OF RESIDUES WHICH ARISE IN INDUSTRIAL PROCESSES AND IN WASTE INCINERATION

This invention relates to a process for treatment of filter ashes, which arise during waste disposal, in particular through a two-stage reduction of the metal compounds obtained, reusable metal and silicon-containing alloys being recovered.

For reduction of the pollution burden in the vicinity of waste incineration plants, these plants are equipped with so-called flue gas cleaning filters. The dust and products which arise at these plants from the further flue gas cleaning are heavily polluted by heavy metals and are therefore toxic (see Table 1). At the present time the so-called filter ashes are treated using conventional, wet-chemical recycling processes so that the aforementioned toxic substances can be extracted for reuse.

For the described residues, ashes and dust there are three treatment principles known today:

a) Immobilizing, or respectively consolidating, toxic filter ashes into non-leachable substances, whereby the heavy metals are still present in the toxic, ionized form. Belonging here are consolidation methods with preferably cement or clays. Also belonging to this category are thermal (smelting) processes in which the metals are embedded in a stable, leach-proof glass matrix.

b) Extracting the heavy metals from the largely inert matrix by means of suitable elutriation or respectively distillation methods and separate treatment of the eluates or respectively distillates. The inert matrix, depleted of heavy metals, can be sent for reprocessing if the toxic organic compounds have been previously destroyed. The separated metal compounds are still toxic and are considered special waste. Therefore they cannot be disposed of without further conditioning.

c) Reducing the heavy metal ions to metals. In this way metal products, which can be reused, are extracted from toxic substances and compounds. A known process of this kind treats residues from combustion in an iron melt first by oxidation, then by reduction at temperatures over 1300° C. or respectively over 1450° C.

Owing to the declining market for heavy metals and the energy-intensive, costly processes, treatments of this kind are at present not very attractive for economic reasons. Furthermore the components remain partly in a toxic form even after the treatment. Therefore there is a need for other solutions to the problem of disposal of filter ashes, solutions without the aforementioned drawbacks, which allow an economical and environmentally sound reprocessing of toxic and environmentally relevant components.

It has been discovered that the said residues can be treated economically if they are subjected to a fused salt electrolysis in an aluminum furnace. It has been further discovered—so that less electrical energy is required—that the heavy metals can be reduced and extracted economically with a prior reduction using carbon.

The object of the present invention is therefore a process for the treatment of filter ashes, which arise during waste disposal and are polluted with heavy metals and/or heavy metal compounds, by means of a two-stage reduction of the obtained metal compounds with formation of reusable metals and metal and/or silicon-containing alloys.

The process according to the invention with the reduction of residues, such as filter ashes, in two stages, leads to the following advantages:

It can be used on many kinds of starting substances, such as ashes, filter ashes, dusts, foundry sands, sludges, contaminated earth, etc.

Not only are the toxic heavy metals bound more or less firmly in a matrix, as in the case of immobilization processes, but they are also put into a non-toxic. reduced form.

The lowering of the melting temperature of residues from combustion through suitable substances saves energy.

The greatest consumer of current during the electrical reduction is silicon (compare Table 1), amounting to practically 80 percent of the reduction current. If silicon is reduced with inexpensive coal and/or calcium carbide, the process becomes less expensive and considerably more interesting economically since expensive electric current can be saved.

The materials used in exhaust gas cleaning, coke, coal dust or activated charcoal serve, after charging, as reduction means.

The slags which arise can be mixed with substances which result in exactly those characteristics which suit a potential purchaser.

It is advantageous when the magnetic particles are first released from the pre-purified filter ashes or other residue by means of moderately strong magnets. The material is preferably dried. The drying process can be controlled in such a way that, depending upon need, the most readily volatile compounds and elements are distilled off. The removal of magnetic particles serves the purpose of mainly freeing the final product from iron since iron diminishes the quality of the final product, above all in aluminum alloys. If iron is separated as silicon iron, it does not matter. The drying before reduction has the purpose of removing water, which would lead at least in part to the undesired formation of hydrogen fluoride at the anode. Under certain conditions hydrogen can also be used for reduction.

In the first reduction stage, the filter ashes are mixed with coal and/or carbide and subsequently, if need be, with a substance mixture reducing the melting temperature of the ashes, and are put in the reactor. In the following coal stands for coal, coal dust, coke, anthracite or charcoal; calcium carbide is suitable, for example, as the carbide. The first reduction stage takes place preferably in solid form. The large specific surface of filter ashes is well suited to solid state reactions.

If before, during or after the first reduction stage alkali oxides, alkali borates or mixtures thereof are added up to a weight of 2 to 20%, which are known to lower the melting temperature of glass, it can be achieved that the melting of the glass particles in the filter ashes in the second reduction stage takes place at lower temperatures, which reduces electricity consumption and allows fewer volatile substances to be distilled off.

Distilled off portions of the metals or metal compounds of zinc, lead, tin, cadmium and mercury can be condensed back. As adsorbent, coke, coal dust or activated charcoal come into question, which are used after use as reduction to means. In this first stage the more noble, coal-reducible elements are reduced, namely the parts not evaporated, copper, nickel, lead, iron, zinc and silicon. The reduction takes place preferably in a reactor, which is heated up to the required temperature by means of fossil fuels, e.g., coal, oil or an electric arc. The coal and the carbide thereby serve as reduction means and can reduce the substances indicated in Table 2. The remaining, further electrically reducible, base elements in the slag consist, for the most part, of aluminum oxides. The aforementioned elements from the residues are recovered reductively from an eutectic salt melt in a second reduction stage by means of electric current. This is known from aluminum manufacturing, and this melt comprises cryolite. By adding sodium fluoride and/or sodium chloride, magnesium fluoride or aluminum fluoride, the electrolytic conditions, in particular the conductivity, is controlled in such a way that an optimal bath temperature results through electrical resistance losses, of preferably between 800 and 1300° C. The controlled addition of these additives makes possible an optimization of the solubility of the filter ashes in the melt. A fused salt electrolysis without additives raises the temperature of the melt and thus also the energy consumption. The quantity of non-reducible waste substances is thereby decreased. Increased amounts of additives, on the other hand, lower the melting temperature and therefore the electricity consumption, but lead to an increase in the quantity of non-reducible waste products. The quantity of additives added is to be adjusted to the waste substances to be treated and to the available energy. The non-reducible materials and compounds can be removed as slags, either fluid or solid and according to the intended further use, possibly mixed, still in the fluid state, with additional compounds or elements, resulting in characteristics corresponding to the wishes of a potential purchaser. The reactor of the two reduction stages can be a correspondingly adapted molten bath, similar to that used in the aluminum industry, and can, if needed, be provided with an additional heating for the first reduction stage. If the two reductions are carried out separately, the reactor of the first stage can consist of a melting crucible, a blast furnace, or a fluidized bed kiln; the energy comes from the oxidation of the reduction means, but can also be achieved through additional, partially external, heat sources.

By carrying out the described two-stage process, first reduction with coal and/or calcium carbide until redox potential of silicon, second reduction with electric current up to aluminum, a recycling of metals and of silicon is made possible. The process according to the invention can recover all elements and metals in reduced, non-toxic form, which are more noble than aluminum, or respectively equally noble, and which have not escaped beforehand through vaporizing off or distilling off of their volatile compounds. The process thus distinguishes itself in that it brings back again into the material cycle many toxic heavy metal/metal compounds as non-toxic metal alloys, or respectively silicon-containing alloys. The inventive, two-stage process enables a considerable improvement in method to be achieved over a one-step, fused salt electrolysis realized with electricity alone as it requires only about 15 percent of the electrical energy which would be needed in the case of a one-step electrical reduction of the entire residues. Thus the result is an almost 80% savings in energy and therefore a considerably better process economically. Until today, for filter ashes and analogues, no reduction process has existed able to reduce the base elements with as low a redox potential as aluminum. At the same time the process according to the invention can destroy any organic substances oxidatively.

The slags which arise mainly after the second reduction, but also the products of the separately executed first reduction stage can be supplemented with those additives which are still lacking to enable use as raw material in the concrete industry. Depending upon the market situation, glass-forming substances such as iron oxide or silicon oxide, for example, can be added to the molten slags so that the slags conform with the respective regulations of law.

TABLE 1

Composition of typical electro-static filter ash

| Element | Percent | Valence | Mol. Wt. | Mol | Electron Equivalents |
|---|---|---|---|---|---|
| Magnesium | 1.20 | | | | |
| Sodium | 2.70 | | | | |
| Calcium | 8.40 | | | | |
| Potassium | 4.40 | | | | |
| Barium | 0.20 | | | | |
| Copper | 0.17 | 2 | 65.5 | 0.026 | 0.052 |
| Lead | 1.20 | 2 | 207.2 | 0.058 | 0.116 |
| Tin | 0.16 | 4 | 118.7 | 0.013 | 0.054 |
| Nickel | 0.03 | 2 | 58.7 | 0.005 | 0.010 |
| Cadmium | 0.04 | 2 | 112.4 | 0.004 | 0.007 |
| Iron | 2.50 | 3 | 55.8 | 0.448 | 1.344 |
| Chromium | 0.10 | 3 | 52.0 | 0.019 | 0.058 |
| Zinc | 3.60 | 2 | 65.4 | 0.550 | 1.101 |
| Silicon | 28.00 | 4 | 28.0 | 10.00 | 40.00 |
| Manganese | 0.16 | 2 | 54.9 | 0.029 | 0.058 |
| Aluminum | 6.80 | 3 | 27.0 | 2.519 | 7.560 |
| Sulfate | 4.70 | | | | |
| Total C | 2.30 | | | | |
| Oxygen, hydrogen | 20.18 | | | | |
| Carbonate C | 0.16 | | | | |
| Sulfur | 4.80 | | | | |
| Chloride | 8.20 | | | | |
| Total | 100.00 | | | | 50.36 |

The table shows data on electrostatic filter ashes. The percentage indications for the composition come from the BUS Report No. 62 (BUS=Federal Office for Environmental Protection; successor organization: Federal Office for the Environment, Forests and Agriculture, Berne, Switzerland).

The completely filled in rows, beginning with copper, ending with aluminum, contain the elements which can be reduced. The elements magnesium to barium are not reduced during the aluminum reduction and remain in a slag enriched with heavy metals. In addition, the valence is indicated (others also appear) of the elements and the number of mol per kilogram of ashes. From this data the electron equivalents can be calculated, which are necessary for the reduction. Silicon requires the most electrons, almost 80 percent.

TABLE 2

Metal content of a typical electro-static filter ash with indication of the respective reduction means

| Element | Percent | Reduction with | Electron equivalents | % Share |
|---|---|---|---|---|
| Copper | 0.17 | carbon | 0.052 | 0.1 |
| Lead | 1.20 | carbon | 0.116 | 0.2 |
| Tin | 0.16 | carbon | 0.055 | 0.1 |
| Nickel | 0.03 | carbon | 0.010 | 0.02 |
| Cadmium | 0.04 | carbon | 0.007 | 0.01 |
| Iron | 2.50 | carbon | 1.344 | 2.7 |
| Chromium | 0.10 | current | 0.058 | 0.1 |
| Zinc | 3.60 | carbon | 1.101 | 2.2 |
| Silicon | 28.00 | carbon | 40.000 | 79.4 |
| Manganese | 0.16 | current | 0.058 | 0.1 |
| Aluminum | 6.80 | current | 7.556 | 15.0 |
| Total | 42.7 | | 50.360 | 100.0 |

The table shows data on electrostatic filter ashes. The percentage indications for the composition come from the BUS Report No. 62.

Of the reducible elements presented, sorted according to declining redox potential, about 85 percent by weight can be successfully reduced with the less expensive carbon and/or calcium carbide; the rest, about 15%, must be reduced by fused salt electrolysis. Silicon requires thereby the most electrons, almost 80 percent. The introduction of the carbon reduction step reduces the electricity consumption markedly and makes the process considerably less expensive and more economical. Chromium cannot be reduced by means of carbon because at the required temperature carbide is also formed.

Example

In a laboratory test, 1000 g of a dried electrostatic filter ash of a waste incineration plant is introduced together with charcoal into a reactor and is heated. The following reaction in the pulverulent filter ashes thereby takes place:

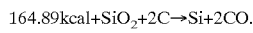
164.89kcal+$SiO_2$+2C→Si+2CO.

With sufficiently long reaction time and sufficient reaction temperature, the volatile elements such as lead, cadmium and zinc are evaporated, and are recovered, partially through condensation, in a cold trap.

The residue contains the mainly reduced, non-volatile elements in powder form, which correspond approximately to the values according to Table 2. Mainly aluminum remains in oxidized form.

The material thus obtained is recovered reductively in the second reduction stage by means of electric current from an eutectic salt melt known from the aluminum industry. This melt comprises cryolite and further substances used in aluminum manufacturing such as aluminum fluoride and sodium fluoride.

With a filter ash/aluminum oxide ratio of about 40/60, reduction in the aluminum furnace requires approximately 20% by weight of fluoride (as $Na_3AlF_6$+$AlF_3$) in relation to the alloy. The non-reducible portions (see Table 1) are thereby removed in fluid form as slag, and the alloy formed is suctioned off out of the melt-reduction bath by means of a suction device.

Alternatively, the second reduction stage is carried out in a melt with decreased quantities of the additives known from the aluminum industry, or even with only the molten residue from the first reduction stage alone. The melt without additives then has a temperature of about 1450° C.±80° C., depending upon filter ashes being used.

I claim:

1. A process for formation of metal-containing and silicon-containing alloys by treatment of residues containing aluminum, the residues arising during waste dispose and which are polluted with heavy metals and/or heavy metal compounds, through a two-stage reduction of the contained metal compounds processes in industry and during waste disposal, by reduction of the contained metal compounds with formation of reusable metal-containing and silicon-containing alloys, said process comprising:

a) carrying out a first reduction step using carbon or carbon-generating means as the reduction means under conditions such that the compounds of silicon and metals, which have a standard potential which is greater than that of silicon are reduced, the metals obtained are separated, and subsequently the residue, which contains aluminum in oxidized form, is converted to a salt melt, and b) subjecting the obtained salt melt, which contains aluminum in oxidized form, to a second reduction stage, in that a fused salt electrolysis is carried out with extraction of aluminum, a melt containing aluminum and silicon being obtained.

2. The process according to claim 1, wherein in the first reduction step coal, coke, charcoal, sawdust, carbide compounds or mixtures thereof are the reduction means.

3. The process according to claim 1, wherein for the second reduction step a mixture of alkali oxides and/or alkali borates, up to 20% by weight, with respect to the total weight, is added to the residues to be treated to lower the melting point.

4. The process according to claim 1, wherein in the second reduction step the residue separated from the reduced metals in the first reduction step is transferred to a salt melt consisting pre-dominantly of cryolite and NaF.

5. The process according to claim 1, wherein volatile metals, compounds, vapors and salts escaping during the first reduction stage are adsorbed in the coke, coal dust, filter ashes or aluminum oxide by counter-current processing and subsequently brought back partially into the reduction chamber, and are partially removed from the reaction system, insofar as metals are concerned.

6. The process according to claim 1, wherein the salt melt is collected in the reactor and is subsequently separated from the aluminum melt.

7. The process according to claim 1, wherein magnetic compounds are removed from the residues by a magnet, if necessary also after the first reduction stage and a reduction of the residues.

8. The process according to claim 1, wherein the residues are pre-dried.

9. The process according to claim 1, wherein the residues are heated prior to the reduction in order to evaporate and separate mercury and cadmium.

10. The process according to claim 1, wherein sodium chloride and/or aluminum fluoride are added as further additives to the salt melt for the fused salt electrolysis, while the bath temperature lies between 800 and 1300° C., and which increase the solubility of the filter ashes in the melt, and the conditions in the reactor are adjusted such that the obtained metal and/or silicon-containing alloys in their properties are subsequently usable.

11. The process according to claim 1, wherein the first reduction stage takes place locally separate from, or locally coupled to, the second reduction stage.

12. The process according to claim 1, wherein iron, and/or silicon iron and/or silicon or further alloys are removed separately out of the first reduction stage.

13. The process according to claim 1, wherein the residue after the first reduction stage is conducted into an aluminum-melt electrolytic furnace, the second reduction stage being carried out jointly for aluminum production and according to the requirements therefor.

14. The process according to claim 1, wherein the residue after the first reduction stage and before the second reduction stage is subjected to an enrichment with metal, scrap, sludges, dusts, aluminum oxide or clay and/or other substances.

15. The process according to claim 1, wherein the non-reducible slag, which arises after the fused salt electrolysis, is taken from the reactor in solid or fluid form for use as raw material for concrete.

* * * * *